United States Patent
Su

(10) Patent No.: US 10,588,191 B2
(45) Date of Patent: Mar. 10, 2020

(54) FRESH LAMP, MOBILE TERMINAL, AND SYSTEM AND METHOD FOR DETERMINING PRODUCT INFORMATION

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventor: Hao Su, Beijing (CN)

(73) Assignees: BOE TECHNOLOGY GROUP CO., LTD., Beijing (CN); BOE OPTICAL SCIENCE AND TECHNOLOGY CO., LTD., Suzhou, Jiangsu (CN)

(*) Notice: Subject to any disclaimer, the term of this patent is extended or adjusted under 35 U.S.C. 154(b) by 0 days.

(21) Appl. No.: 15/743,654

(22) PCT Filed: May 23, 2017

(86) PCT No.: PCT/CN2017/085481
§ 371 (c)(1),
(2) Date: Jan. 10, 2018

(87) PCT Pub. No.: WO2017/206762
PCT Pub. Date: Dec. 7, 2017

(65) Prior Publication Data
US 2018/0206304 A1    Jul. 19, 2018

(30) Foreign Application Priority Data

May 30, 2016   (CN) .......................... 2016 1 0371110

(51) Int. Cl.
*F21V 23/00*   (2015.01)
*H05B 33/08*   (2020.01)
(Continued)

(52) U.S. Cl.
CPC .......... *H05B 33/0854* (2013.01); *F21S 10/00* (2013.01); *F21V 1/143* (2013.01);
(Continued)

(58) Field of Classification Search
CPC ... H05B 33/10; H05B 33/0845; F21V 23/004; G06F 9/06; G09G 2330/021
See application file for complete search history.

(56) References Cited

U.S. PATENT DOCUMENTS 7,729,941 B2 *   6/2010   Zampini, II ....... G06Q 30/0241
                                                               705/14.4
9,089,227 B2 *   7/2015   Pas ......................... A47F 11/10
(Continued)

FOREIGN PATENT DOCUMENTS

CN   101513127 A   8/2009
CN   102749072 A   10/2012
(Continued)

OTHER PUBLICATIONS

Office Action received for Chinese Patent Application No. 201610371110.8, dated Oct. 25, 2017, 22 pages (12 pages of English Translation and 10 pages of Office Action).
(Continued)

*Primary Examiner* — Thuy V Tran
(74) *Attorney, Agent, or Firm* — Womble Bond Dickinson (US) LLP

(57) ABSTRACT

A fresh lamp, which includes: an LED module, and a driving power supply connected to the LED module which includes a bright-dark control circuit; wherein the bright-dark control circuit includes a programmable circuit, the programmable circuit being configured to program product information into binary codes; wherein the bright-dark control circuit is configured to switch on the driving power supply according to one of the numbers "1" and "0" in the binary codes and
(Continued)

switch off the driving power supply according to the other one of the numbers "1" and "0" in the binary codes so that the LED module emits light signals alternating with brightness and darkness to form light emission information corresponding to the product information.

2 Claims, 3 Drawing Sheets

(51) Int. Cl.

| | | |
|---|---|---|
| F21V 29/503 | (2015.01) | |
| H05B 37/02 | (2006.01) | |
| F21S 10/00 | (2006.01) | |
| F21V 29/89 | (2015.01) | |
| F21V 1/14 | (2006.01) | |
| F21V 15/01 | (2006.01) | |
| F21V 29/70 | (2015.01) | |
| G06F 9/06 | (2006.01) | |
| H05B 33/10 | (2006.01) | |
| F21Y 115/10 | (2016.01) | |
| F21V 3/06 | (2018.01) | |

(52) U.S. Cl.
CPC ............ *F21V 15/01* (2013.01); *F21V 23/006* (2013.01); *F21V 29/503* (2015.01); *F21V 29/89* (2015.01); *H05B 33/0845* (2013.01); *H05B 37/029* (2013.01); *H05B 37/0272* (2013.01); *F21V 3/061* (2018.02); *F21V 23/004* (2013.01); *F21V 29/70* (2015.01); *F21Y 2115/10* (2016.08); *G06F 9/06* (2013.01); *G09G 2330/021* (2013.01); *H05B 33/10* (2013.01); *Y02B 20/341* (2013.01); *Y02B 20/346* (2013.01)

(56) References Cited

U.S. PATENT DOCUMENTS

| | | | |
|---|---|---|---|
| 9,113,512 B2* | 8/2015 | Welten | H05B 33/083 |
| 2010/0213876 A1 | 8/2010 | Adamson et al. | |
| 2014/0086590 A1* | 3/2014 | Ganick | G06Q 30/02 |
| | | | 398/118 |
| 2014/0159588 A1* | 6/2014 | So | H05B 37/0272 |
| | | | 315/152 |
| 2014/0301737 A1 | 10/2014 | Guo et al. | |
| 2015/0098206 A1* | 4/2015 | Pickard | F21K 9/23 |
| | | | 362/84 |

FOREIGN PATENT DOCUMENTS

| | | |
|---|---|---|
| CN | 103297133 A | 9/2013 |
| CN | 103427902 A | 12/2013 |
| CN | 103701527 A | 4/2014 |
| CN | 204187411 U | 3/2015 |
| CN | 104504422 A | 4/2015 |
| CN | 105898924 A | 8/2016 |
| CN | 205793502 U | 12/2016 |
| CN | 205793502 U | 12/2016 |
| JP | 2006-259813 A | 9/2006 |

OTHER PUBLICATIONS

Office Action received for Chinese Patent Application No. 201610371110.8, dated Apr. 17, 2017, 20 pages (11 pages of English Translation and 9 pages of Office Action).

International Search Report received for PCT Patent Application No. PCT/CN2017/085481, dated Aug. 25, 2017, 8 pages (3 pages of English Translation and 5 pages of Original Document).

"Third office action," CN Application No. 201610371110.8 (dated Apr. 19, 2018).

\* cited by examiner

FRESH LAMP, MOBILE TERMINAL, AND SYSTEM AND METHOD FOR DETERMINING PRODUCT INFORMATION

RELATED APPLICATION

The present application is the U.S. national phase entry of PCT/CN2017/085481, with an international filing date of May 23, 2017, which claims the benefit of Chinese Patent Application No. 201610371110.8, filed on May 30, 2016, the entire disclosures of which are incorporated herein by reference.

TECHNICAL FIELD

The present disclosure relates to the technical field of illumination, in particular to a fresh lamp, a mobile terminal, and a system and a method for determining product information.

BACKGROUND

Nowadays, products in supermarkets and fresh food markets are usually irradiated by fresh lamps so as to become more attractive to customers and to stimulate consumer purchasing desire. Conventional fresh lamps have such characteristic as high color rendering index, but they can only serve as illumination devices, thus having the problem of having only a single function.

SUMMARY

According to a first aspect of the present disclosure, an embodiment of the present disclosure provides a fresh lamp, comprising: an LED module, and a driving power supply connected to the LED module and comprising a bright-dark control circuit; wherein the bright-dark control circuit comprises a programmable circuit, the programmable circuit being configured to program product information into binary codes; wherein the bright-dark control circuit is configured to switch on the driving power supply according to one of the numbers "1" and "0" in the binary codes and switch off the driving power supply according to the other one of the numbers "1" and "0" in the binary codes so that the LED module emits light signals alternating with brightness and darkness to form light emission information corresponding to the product information.

Optionally, the fresh lamp may further comprises a heat dissipation device, wherein the LED module is mounted on a surface of one side of the heat dissipation device, and the driving power supply is mounted on the heat dissipation device.

Optionally, an opening is provided on a surface of a side of the heat dissipation device facing away from the LED module, which is connected to an internal cavity of the heat dissipation device, and the driving power supply is mounted in the cavity of the heat dissipation device.

Optionally, materials of the heat dissipation device may include aluminum, for example.

Optionally, the fresh lamp may further comprise a protective lens disposed on a light emergent side of the LED module. For example, the protective lens is made of a glass material.

Optionally, the LED module may be integrated on a printed circuit board, and the printed circuit board may be mounted on the heat dissipation device.

As an example, the programmable circuit can be a digital signal processor (DSP), a programmable logic controller (PLC), a programmable logic array (FPGA), a central processing unit (CPU) or a micro-processor (MCU).

Optionally, the fresh lamp may further comprise a lamp shade so as to control a light illumination angle of the LED module.

According to a second aspect of the present disclosure, an embodiment of the present disclosure provides a mobile terminal, comprising:

a light information collecting circuit configured to collect light emission information formed by light signals emitted by the LED module of any fresh lamp as provided in the above technical solutions;

an information processing circuit that is connected to the light information collecting circuit and configured to determine product information corresponding to the light emission information according to a pre-stored product information matching relation.

Optionally, the light information collecting circuit can comprise a camera.

According to a third aspect of the present disclosure, an embodiment of the present disclosure further provides a system for determining product information, comprising any fresh lamp as provided in the above technical solutions, and any mobile terminal as provided in the above technical solutions.

According to a fourth aspect of the present disclosure, an embodiment of the present disclosure further provides a method for determining product information for use in supermarkets and fresh food markets, which comprises:

controlling an LED module to emit light signals alternating with brightness and darkness to form light emission information;

collecting the light emission information formed by the LED module;

determining product information corresponding to the collected light emission information according to a pre-stored product information matching relation.

Optionally, the product information include at least one of name information, place of production information, price information, production date information and quality guarantee period information.

DETAILED DESCRIPTION

Technical solutions in embodiments of the present disclosure will be described clearly and completely below with reference to the drawings. Obviously, the described embodiments are merely some instead of all of the embodiments of the present disclosure. On the basis of the embodiments described herein, all other embodiments that can be obtained by those skilled in the art without using any inventive skills shall fall into the protection scope of the present disclosure.

Embodiments of the present disclosure provide a fresh lamp, a mobile terminal, and a system and a method for determining product information. The system for determining product information comprises the fresh lamp and the mobile terminal. The fresh lamp controls a driving power supply through a bright-dark control circuit, so that an LED module emits light signals alternating with brightness and darkness to form light emission information. Thus the fresh lamp has functions like illumination and transmitting product information, besides, the mobile terminal can acquire corresponding product information through the collected light emission information transmitted by the fresh lamp. The fresh lamp can be used in places like supermarkets, fresh food markets, etc. to illuminate products to achieve expected light effects and to transmit product information through the emitted light signals.

Figure 1:
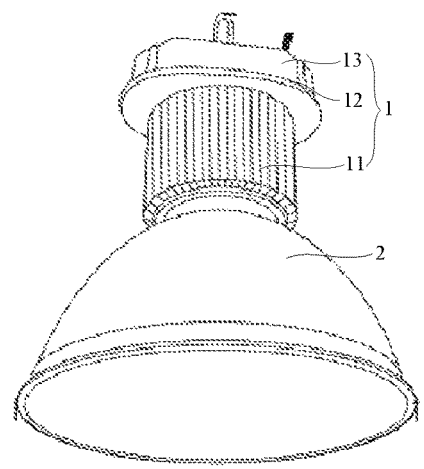
FIG. 1 is a schematic drawing of a fresh lamp according to an embodiment of the present disclosure.
Figure 2:
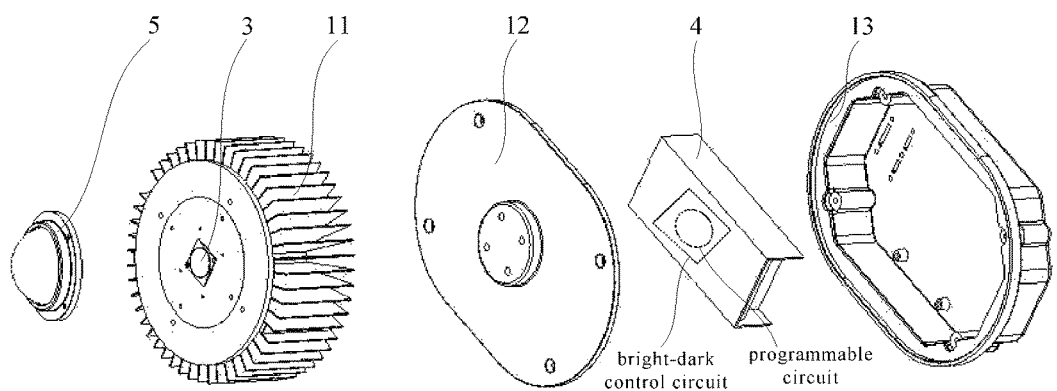
FIG. 2 is a schematic drawing of components of the fresh lamp of FIG. 1 with the lamp shade removed.
Figure 4:
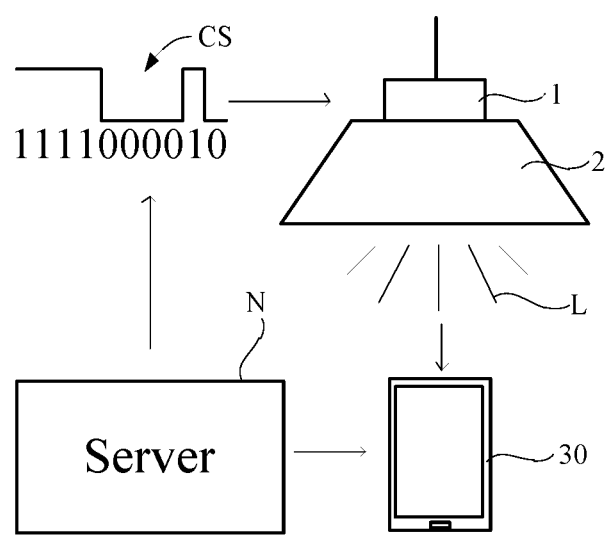
FIG. 4 is a schematic drawing of a system for determining product information according to an embodiment of the present disclosure.

FIG. 1 is a schematic drawing of a fresh lamp according to an embodiment of the present disclosure, and the detailed structure thereof is shown in FIG. 2. The fresh lamp comprises an LED module 3 and a driving power supply 4 which is electrically connected to the LED module 3 and comprises a bright-dark control circuit, wherein the bright-dark control circuit is configured to control the driving power supply 4, so that the LED module 3 emits light signals alternating with brightness and darkness to form light emission information L (as shown in FIG. 4).

The LED module emitting light signals alternating with brightness and darkness to form light emission information L as stated above means that the bright-dark control circuit is configured to control the driving power supply 4, so that the light signals emitted by the LED module 3 alternate with a bright state and a dark state so as to form the light emission information L.

In an embodiment of the present disclosure, light signals emitted by the LED module 3 alternating with a bright state and a dark state refers to presence and absence of light signals emitted by the LED module 3, i.e. the bright-dark control circuit is configured to control on and off of the driving power supply 4 so as to enable the LED module 3 to have alternating bright state (in which the driving power supply 4 is switched on and the LED module 3 emits light) and dark state (in which the driving power supply is switched off and the LED module 3 does not emit light).

In an embodiment of the present disclosure, light signals emitted by the LED module 3 alternating with a bright state and a dark state refers to the strength of light signals emitted by the LED module 3, i.e. the bright-dark control circuit is configured to control an output power of the driving power supply 4 so as to enable the LED module 3 to have alternating bright state (in which the output power of the driving power supply 4 is controlled, and the brightness of the light emitted by the LED module 3 is not lower than a selected threshold) and dark state (in which the output power of the driving power supply 4 is controlled, and the brightness of the light emitted by the LED module 3 is lower than a selected threshold).

In the fresh lamp provided in the embodiment of the present disclosure, the LED module 3 can realize the illumination function of a common fresh lamp, meanwhile, the bright-dark control circuit can control the driving power supply 4 to enable the LED module 3 to emit light signals alternating with brightness and darkness to form light emission information L. Different light emission information L can represent different product information, so the light emission information L can be used for transmitting product information. Therefore, light emitted by the fresh lamp can not only function to illuminate but also transmit product information.

In an embodiment of the present disclosure, the fresh lamp may further comprises a heat dissipation device 1, wherein the LED module 3 is mounted on a surface of one side of the heat dissipation device, and the driving power supply 4 is mounted on the heat dissipation device 1.

The fresh lamp provided in the above embodiment emits light by the LED module 3, and the heat produced by the LED module 3 during operation can be transferred to the heat dissipation device 1, so that the heat dissipation device 1 cools the LED module 3.

In an embodiment of the present disclosure, as shown in FIGS. 1 and 2, an opening is provided on a surface of a side of the heat dissipation device 1 facing away from the LED module 3, the opening being connected to an internal cavity of the heat dissipation device 1, and the driving power supply 4 is mounted in the cavity of the heat dissipation device.

In the above embodiment, the driving power supply 4 of the fresh lamp can be mounted in the cavity of the heat dissipation device 1 to facilitate heat dissipation and cooling of the driving power supply 4, thereby preventing the driving power supply from being damage by the high temperature produced by heat accumulation. Meanwhile, mounting the driving power supply 4 in the cavity of the heat dissipation device 1 can also help to reduce the volume of the fresh lamp and simplify the structure of the fresh lamp.

In an embodiment of the present disclosure, the heat dissipation device 1 can be made of materials including aluminum so as to improve heat dissipation effect of the heat dissipation device 1. In an embodiment of the present disclosure, the heat dissipation device 1 can be made of an aluminum material.

Since the aluminum material has such characteristics as low density and good heat conductivity, the heat dissipation device 1 made of the aluminum material is light in weight and has a good head dissipation effect, thus the weight of the whole fresh lamp can be reduced and the heat dissipation effect of the fresh lamp can be improved.

As shown in FIGS. 1 and 2, the heat dissipation device 1 may comprise a heating dissipation component 11, a baseboard 12 mounted on one side of the heat dissipation component, and a shade cover 13 for limiting the driving power supply 4 on the baseboard 12.

In an embodiment of the present disclosure, as shown in FIG. 2, the fresh lamp may further comprise a protective lens 5 disposed on a light emergent side of the LED module 3.

For example, the protective lens 5 can be made of a glass material.

The protective lens 5 can be disposed on the light emergent side of the LED module 3 so as to protect the LED module 3; and the protective lens 5 can also adjust (e.g. focus) light emitted by the LED module 3, so that when light emitted by the LED module 3 is irradiated on products in supermarkets and fresh food markets, expected light effects can be achieved, and color saturation and vividness of the products can be increased, thereby promoting purchase desires of customers and increasing sales of products. The protective lens 5 can be made of a glass material, which can avoid aging and yellowing of the lens and have good transparency as well.

In an embodiment of the present disclosure, the LED module 3 can be an LED module with a high hue-saturation so as to better render the colors of fresh products like vegetables, fruits, meat, etc., and to enhance color contrast and increase freshness of the products. In addition, by using the LED module 3, the effects of safety and energy saving can also be achieved.

In an embodiment of the present disclosure, the LED module 3 can be integrated on a printed circuit board, and the printed circuit board can be mounted on the heat dissipation device 1.

By mounting the printed circuit board having the LED module 3 integrated thereon on the heat dissipation device 1, heat produced by the LED module 3 and the printed circuit board can be directly conducted to the heat dissipation device 1, so that the LED module 3 and the printed circuit board can be cooled fast to reduce the probability of damage from high temperature because of poor heat dissipation effect. Therefore, the use life of the fresh lamp is prolonged.

In an embodiment of the present disclosure, the bright-dark control circuit of the driving power supply 4 comprises a programmable circuit which is configured to control the bright-dark control circuit.

During use of the fresh lamp, the driving power supply 4 can be controlled through the bright-dark control circuit, so that the LED module 3 emits light signals alternating with brightness and darkness to form light emission information L. When the bright-dark control circuit comprises the programmable circuit, the bright-dark control circuit can be controlled by programming information stored in the programmable circuit, so that the light emission information L formed by light signals emitted by the LED module 3 can feedback updated product information in time, and thus operation of the fresh lamp become simpler. For example, the programmable circuit programs product information into binary codes, and the bright-dark control circuit is configured to switch on the driving power supply according to one of the numbers "1" and "0" in the binary codes and switch off the driving power supply according to the other one of the numbers "1" and "0" in the binary codes so that the LED module emits light signals alternating with brightness and darkness to form light emission information corresponding to the product information.

As an example, the programmable circuit can be a digital signal processor (DSP), a programmable logic controller (PLC), a programmable logic array (FPGA), a central processing unit (CPU) or a micro-processor (MCU).

In an embodiment of the present disclosure, as shown in FIG. 1, the fresh lamp may further comprises a lamp shade 2 so as to control a light illumination angle of the LED module 3.

Through the lamp shade 2, the light illumination angle of the fresh lamp can be controlled, so that light can irradiate on desired products and produce expected light effects. In addition, the colorful and chic lamp shade 2 can also decorate the shopping environment. The lamp shape 2 can be replaced as desired. The above-mentioned fresh lamp can use the lamp shade 2 having any form, structure, shape, or color, or having any specific light effect. For example, in view of convenience of mounting and replacing of the lamp shade 2, the lamp shade 2 can be mounted on outer circumferential walls of the heat dissipation device 1.

Figure 3:
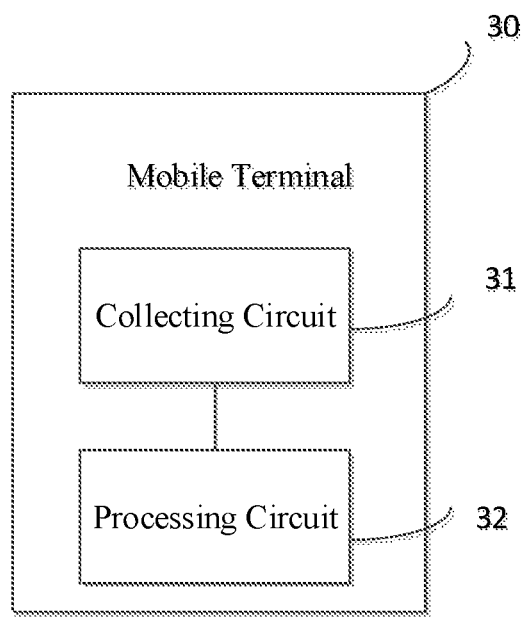
FIG. 3 is a schematic drawing of a mobile terminal according to an embodiment of the present disclosure.

As shown in FIG. 3, an embodiment of the present disclosure further provides a mobile terminal 30, comprising: a light information collecting circuit 31 for collecting light emission information L of the LED module 3 in any of the above-mentioned fresh lamps; and an information processing circuit 32 connected to the light information collecting circuit by signals, which is configured to determine product information corresponding to the light emission information L collected by the light information collecting circuit according to a pre-stored product information matching relation.

In supermarkets or fresh food markets using the above-mentioned fresh lamp to illuminate products, product information can be acquired by the mobile terminal 30 conveniently and quickly.

For example, the light information collecting circuit can be a camera, or any sensor that is capable of collecting light emission information. The information processing circuit can be a central processor, a micro-processor, a co-processor, a single chip machine, an on-chip system or an integrated circuit having information processing capability.

As an example, the mobile terminal 30 can be a portable electronic device such as a mobile phone, a tablet PC, etc.

In an embodiment of the present disclosure, the mobile terminal 30 can schematically be a mobile phone. A user pre-installs an application on the mobile phone, which can identify corresponding product information through the light emission information L. When the user carrying the mobile phone needs to acquire relevant product information, he/she may open the pre-installed application on the mobile phone and turn on the camera of the mobile phone to scan the light emission information L formed by the light signals emitted by the fresh lamp. The application can acquire the light emission information L scanned by the camera and matches the light emission information L with a data packet pre-stored in the mobile phone or with product information stored on a server N. When the light emission information L matches the data packet in the mobile phone or the product information stored on the server N, the application displays the product information on the screen of the mobile phone in a specified format or plays it through the speaker, so that the user can acquire the corresponding product information by seeing or listening.

The user can also selectively acquire relevant product information as needed. The above process can be automatically performed by the application of the mobile phone, so the operation is simple and quick.

As shown in FIG. 4, an embodiment of the present disclosure further provides a system for determining product information for use in supermarkets and fresh food markets, which comprises any of the above-mentioned fresh lamp and the mobile terminal 30.

When using in supermarkets and fresh food markets, the fresh lamp can be used to illuminate products and provide product information at the same time, and the mobile terminal 30 can be used to collect product information provided by the fresh lamp, thus the efficiency of acquisition of product information is increased and more product information can be acquired as well.

Figure 5:
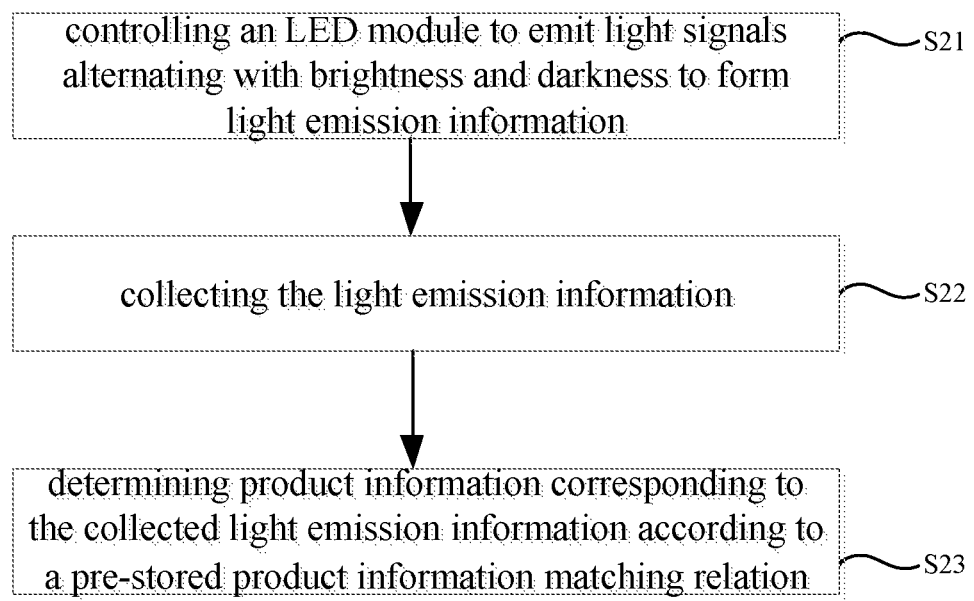
FIG. 5 is a flow chart of a method for determining product information according to an embodiment of the present disclosure.

Referring to FIG. 5, an embodiment of the present disclosure further provides a method for determining product information for use in supermarkets and fresh food markets or in other similar places, which comprises:

step S21: controlling an LED module to emit light signals alternating with brightness and darkness to form light emission information, wherein the LED module can be controlled by a bright-dark control circuit, for example;

step S22: collecting the light emission information;

step S23: determining product information corresponding to the collected light emission information according to a pre-stored product information matching relation.

For example, the product information includes name information, place of production information, price information, production date information and quality guarantee period information, etc. Of course, other product information can be added according to actual needs. During actual use, the product information can be updated in real time through a server N. The mobile terminal 30 can also update data corresponding to the product information in real time through the server N, so that products in the supermarkets or fresh food markets match their own product information, and non-correspondence between the products and the product information can be avoided.

As an example, the specific operation procedure of the method for determining product information is described with reference to FIG. 4.

The fresh lamp is installed in an appropriate place, wherein the control information in the bright-dark control circuit can be controlled, and the driving power supply 4 is controlled so as to control the LED module 3 to emit light signals L alternating with brightness and darkness.

For example, the bright-dark control circuit controls the LED module 3 to illuminate according to binary codes CS "1111000010" of the light signals, the number "1" in the binary codes CS represents that the LED module 3 is turned on, i.e. the LED module 3 goes bright, and the number "0" in the binary codes CS represents that the LED module 3 is turned off, i.e. the LED module 3 goes dark. Continuous switching between brightness and darkness of the LED module 3 can form light emission information L that is acquirable by the mobile terminal 30.

Another example is that the bright-dark control circuit controls the LED module 3 to illuminate according to binary codes CS "1111000010" of the light signals, the number "1" in the binary codes CS represents that the luminous brightness of the LED module 3 is not lower than a threshold (e.g. a threshold of 200 mcd), i.e. the luminous brightness of the LED module 3 is not lower than the threshold 200 mcd; the number "0" in the binary codes CS represents that the luminous brightness of the LED module 3 is lower than the selected threshold, i.e. the luminous brightness of the LED module 3 is lower than the threshold 200 mcd. Continuous switching between brightness and darkness of the LED module 3 can form light emission information L that is acquirable by the mobile terminal 30.

The applicant uses candela as the unit of the luminous brightness in the above descriptions, but to those skilled in the art, other ways are also widely used in the field of LED illumination for evaluating the luminous brightness of the LED, for example, lumen, lux, and nit are used as the unit, and these ways of quantization of the luminous brightness are also applicable to the embodiments of the present disclosure.

Continuous bright-dark control of the LED module 3 can form light emission information L that is acquirable by the mobile terminal 30; and by controlling the bright-dark control circuit, light signals emitted by the LED module 3 can be changed so as to change the light emission information L.

When a user enters into a place having the fresh lamp installed, he/she could use a light information acquisition module of the mobile terminal 30 to acquire light emission information L. For example, light signals emitted by the LED module 3 are scanned by devices like the camera of the mobile phone so as to acquire light emission information L, i.e. the binary code CS "1111000010". The product information represented by the binary code CS "1111000010" can be looked up in the server N through the application pre-installed in the mobile terminal 30 or directly through a mobile network. The product information corresponding to the light emission information L can, for example, be displayed on a screen of the mobile terminal 30 like a mobile phone or be played through a speaker. For example, the product information represented by the binary code CS "1111000010" may include the following contents: product name: cherry, place of production: U.S.A, date of production: May 26, 2016; quality guarantee period: 10 days, price: RMB30/500G. The product information is not limited to the contents as mentioned, but it may include various other information related to the product.

Obviously, those skilled in the art can make various changes and modifications to the embodiments of the present disclosure without departing from the spirit and scope of the present disclosure. If these changes and modifications fall into the scope of the claims and their equivalent technologies, then the present disclosure intends to include these changes and modifications.

The invention claimed is:

1. A method for determining product information, comprising:
controlling an LED module to emit light signals alternating with brightness and darkness to form light emission information;
collecting the light emission information formed by the LED module;
determining product information corresponding to the collected light emission information according to a pre-stored product information matching relation.

2. The method for determining product information according to claim 1, wherein the product information includes at least one of name information, place of production information, price information, production date information and quality guarantee period information.

* * * * *